(12) United States Patent
Venugopalan

(10) Patent No.: US 8,292,125 B2
(45) Date of Patent: Oct. 23, 2012

(54) WATER-SAVER FAUCET WITH MEASURED OUT-FLOW ARRANGEMENT

(75) Inventor: Chenicheri Vadakkil Venugopalan, Bangalore (IN)

(73) Assignee: Chenicheri Vadakkil Venugopalan, Bangalore (IN)

( * ) Notice: Subject to any disclaimer, the term of this patent is extended or adjusted under 35 U.S.C. 154(b) by 992 days.

(21) Appl. No.: 12/295,129

(22) PCT Filed: Mar. 29, 2007

(86) PCT No.: PCT/IN2007/000128
§ 371 (c)(1),
(2), (4) Date: Dec. 2, 2008

(87) PCT Pub. No.: WO2007/113852
PCT Pub. Date: Oct. 11, 2007

(65) Prior Publication Data
US 2010/0012209 A1    Jan. 21, 2010

(30) Foreign Application Priority Data
Mar. 31, 2006   (IN) .............................. 587/CHE/2006

(51) Int. Cl.
*F16K 21/00* (2006.01)
(52) U.S. Cl. ........ 222/158; 222/442; 222/444; 222/453; 137/801
(58) Field of Classification Search .................. 222/158, 222/442, 444, 450, 451, 453; 137/801
See application file for complete search history.

(56) References Cited

U.S. PATENT DOCUMENTS

| 206,151 | A | * | 7/1878 | Tavener | 222/449 |
| 231,592 | A | | 8/1880 | Leach | |
| 568,689 | A | * | 9/1896 | Kent | 222/448 |
| 598,345 | A | * | 2/1898 | Kellom | 222/69 |
| 938,326 | A | * | 10/1909 | Meinert | 222/69 |
| 1,204,865 | A | * | 11/1916 | Hanel | 222/42 |
| 1,342,173 | A | * | 6/1920 | Joslin | 222/453 |
| 1,733,310 | A | * | 10/1929 | Manley | 222/440 |
| 2,111,007 | A | * | 3/1938 | Slobody | 222/442 |
| 5,758,799 | A | * | 6/1998 | Patterson | 222/1 |
| 2006/0138246 | A1 | * | 6/2006 | Stowe et al. | 236/12.12 |

FOREIGN PATENT DOCUMENTS

DE    20 2005 010 233 U1    10/2005

* cited by examiner

*Primary Examiner* — J. Casimer Jacyna
(74) *Attorney, Agent, or Firm* — Reinhart Boerner Van Deuren P.C.

(57) ABSTRACT

The present invention relates to a water-saver faucet to prevent wastage of water by allowing the user to pre-measure and use the desired quantity of water. The water saver faucet has a spout integral with faucet body. A knob is attached to a sliding shaft situated at the front end of the faucet body. A water pipeline is attached to other end of the faucet body. Seal assemblies are provided within the faucet body for sealing or releasing the flow of water. A graduated measuring vessel, attached to the faucet body, enables the user to directly pre-measure the quantity of water that will flow out of the water saver faucet. An air vent valve, provided on top of the graduated measuring vessel, facilitates the in/out flow of water through the graduated measuring vessel. An adopter facilitates the assembly of the graduated measuring vessel and the faucet body.

9 Claims, 9 Drawing Sheets

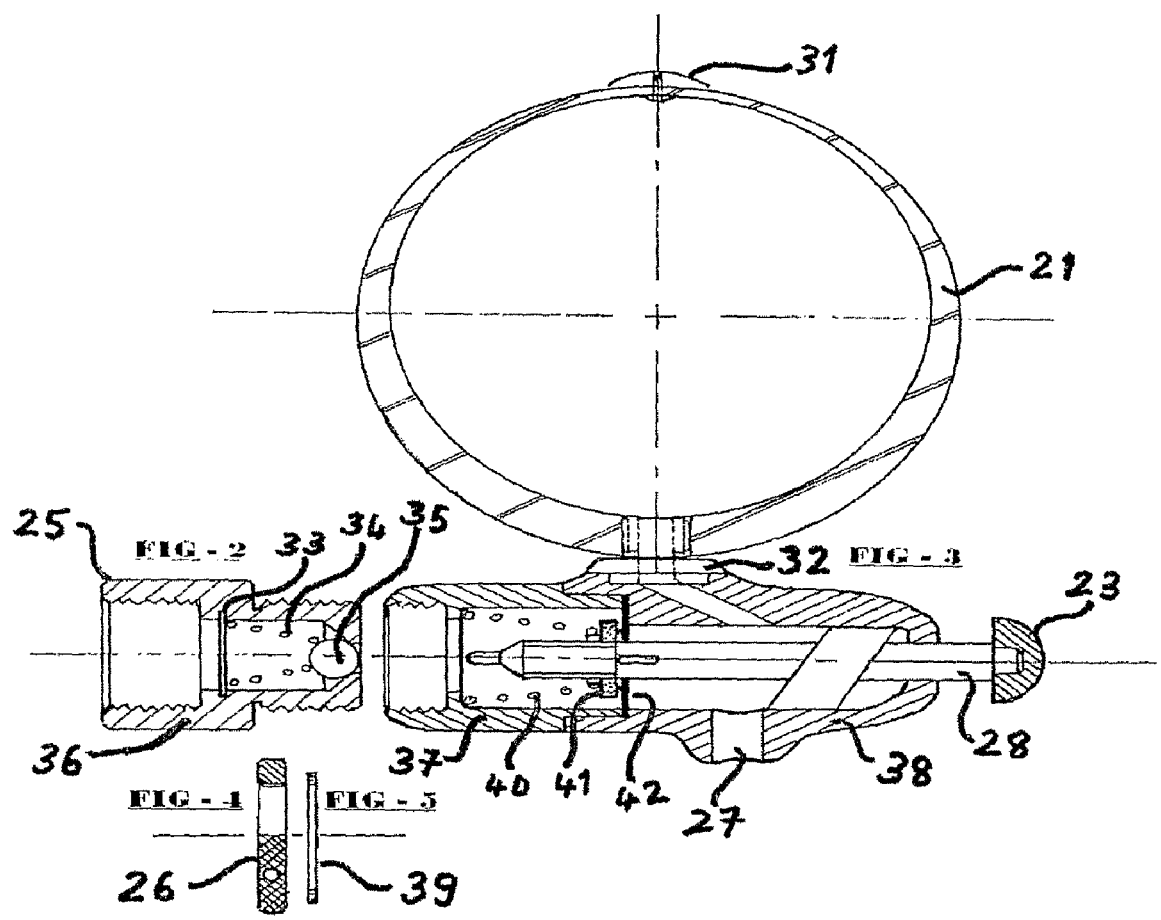

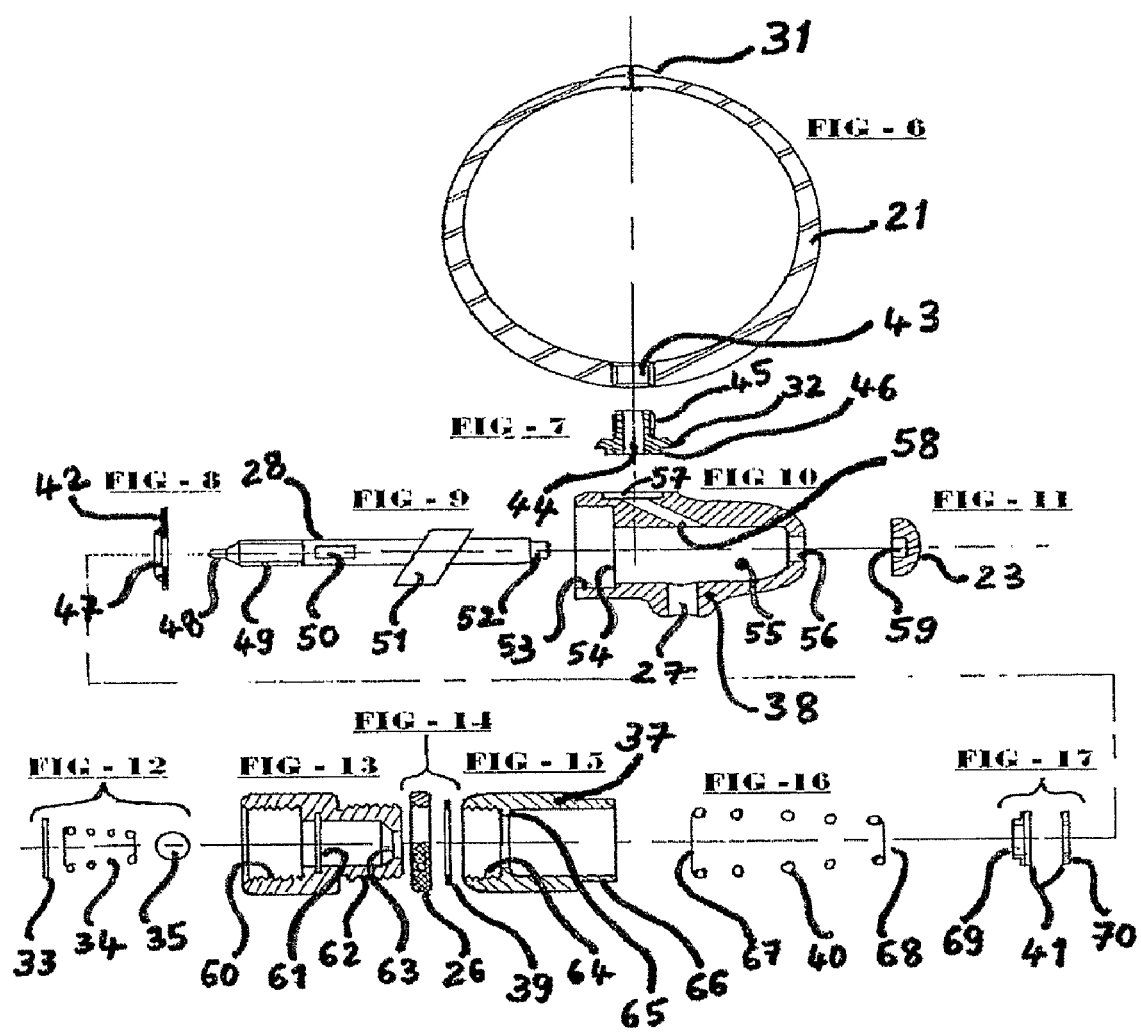

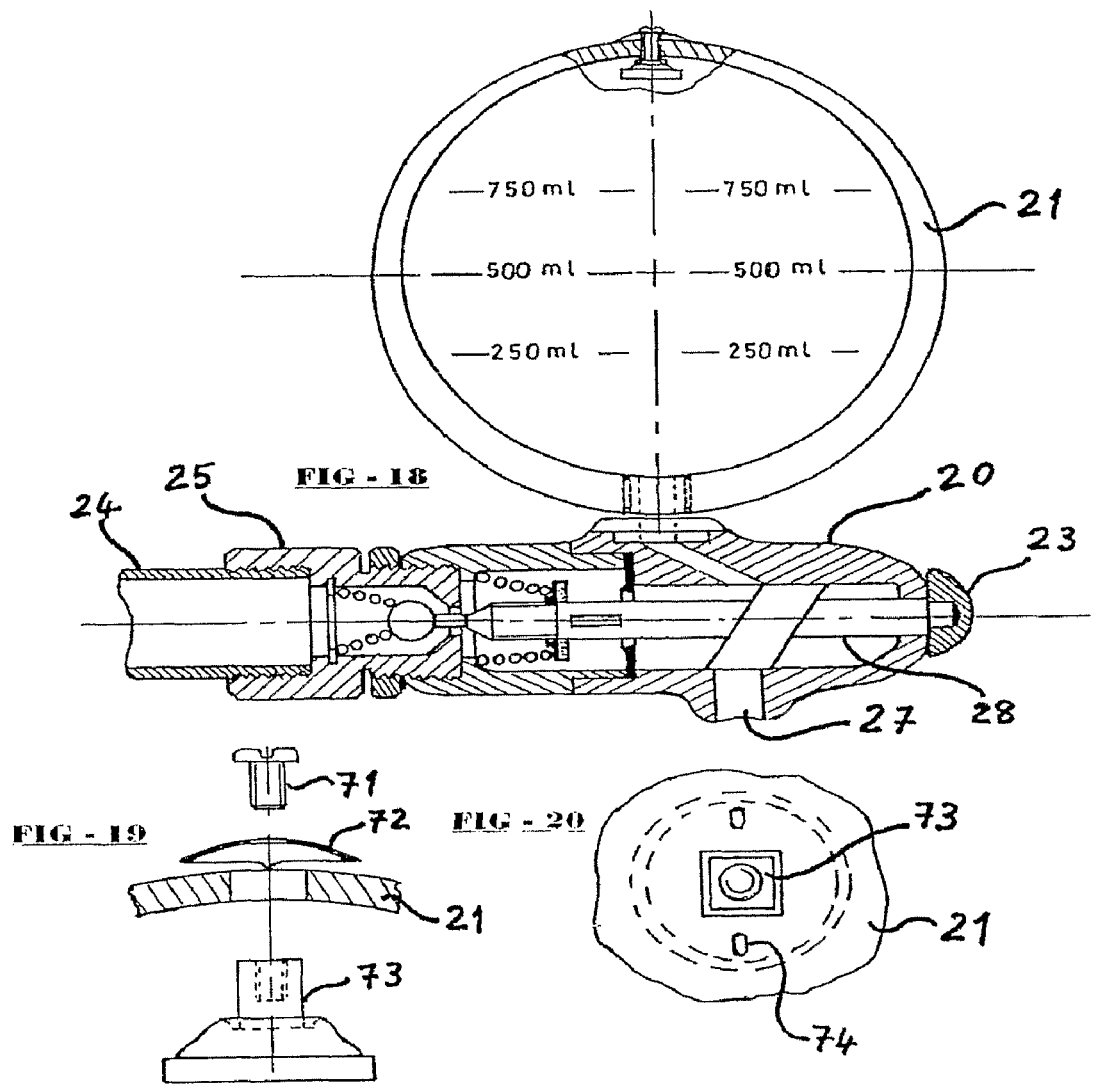

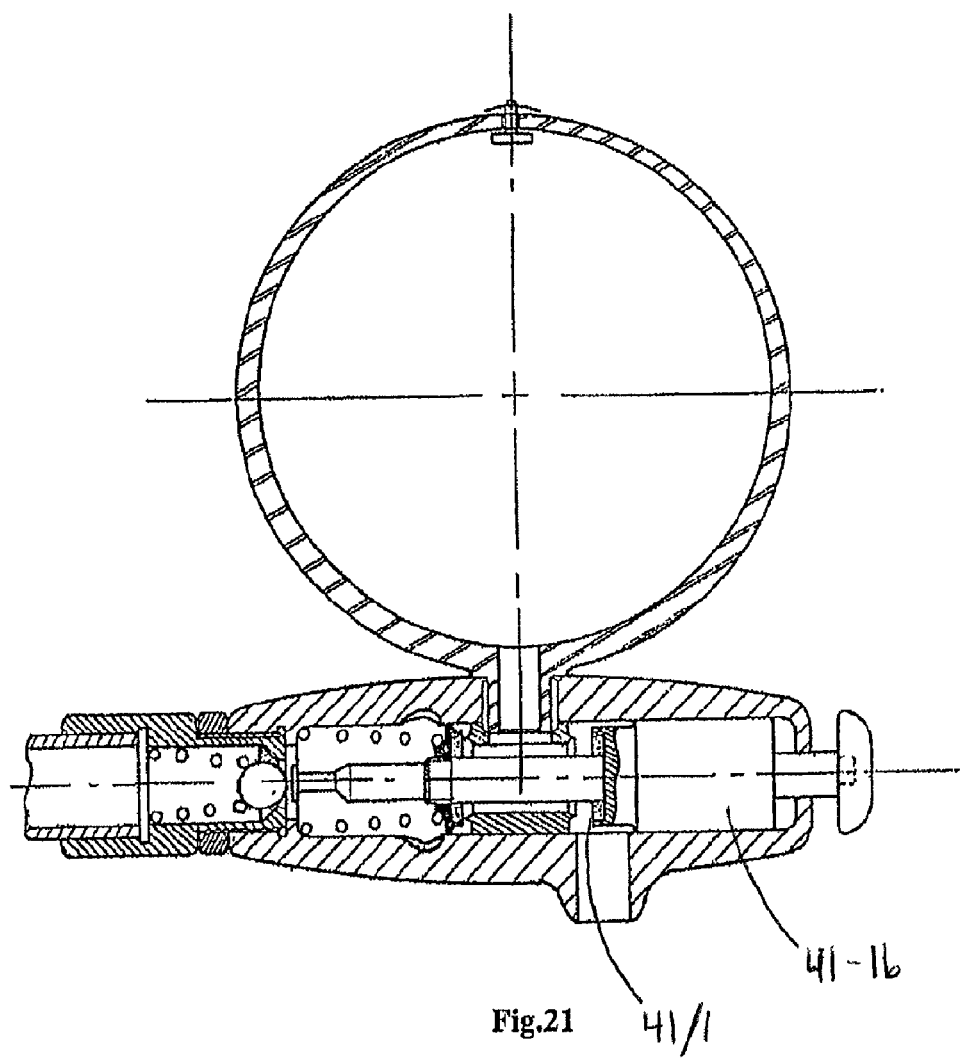
Fig. 21   41/1   41-16

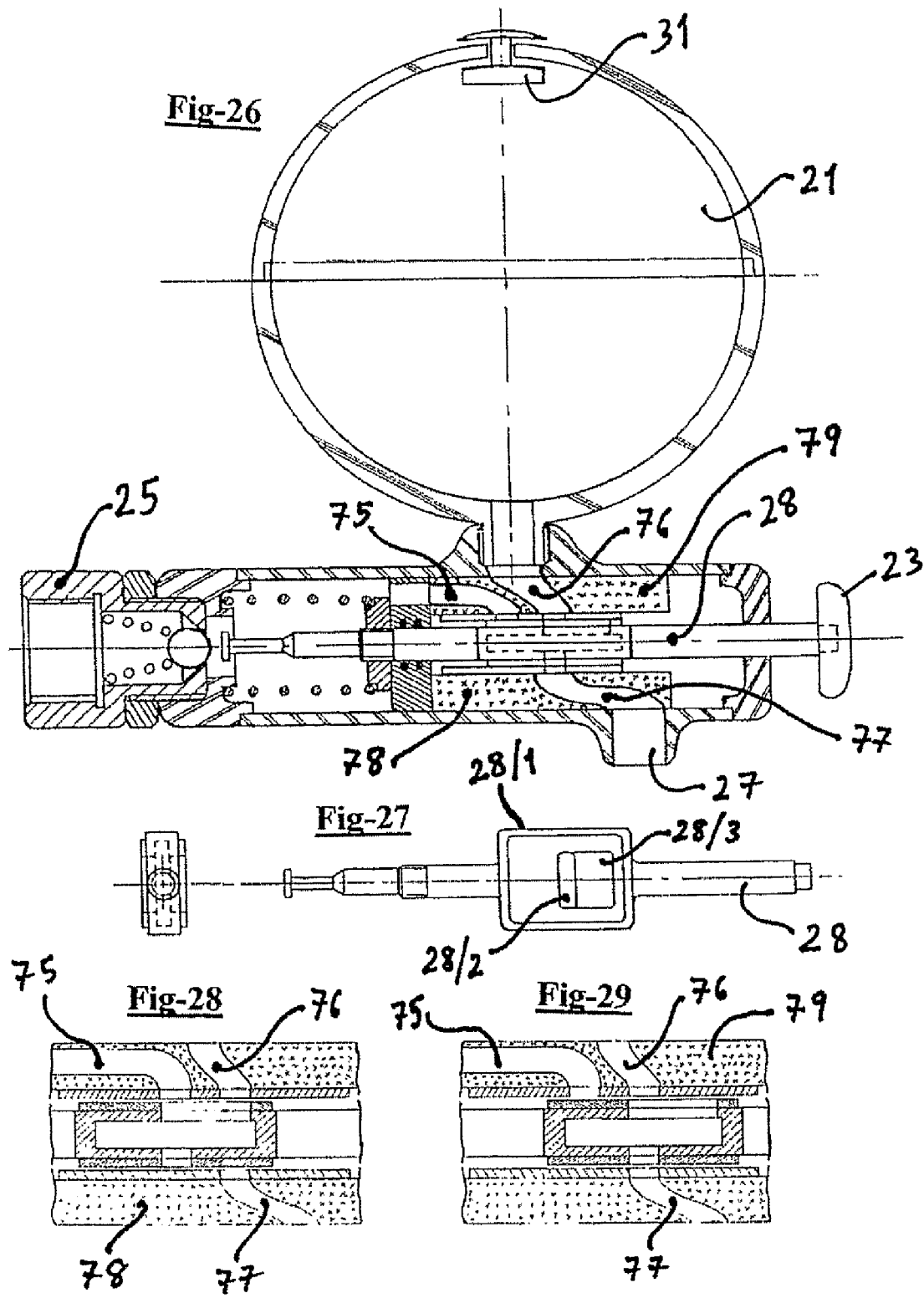

WATER-SAVER FAUCET WITH MEASURED OUT-FLOW ARRANGEMENT

FIELD OF THE INVENTION

The present invention relates to a water-saver faucet to prevent wastage of water by allowing the user to pre-measure and use the desired quantity of water.

BACKGROUND OF THE INVENTION

Fresh water to day has become a precious commodity worldwide. Saving water, avoiding wastage and better utilization of water are becoming a universal concern. This invention can play an important part in avoiding inadvertent wastage during the usage of water for legitimate personal use, such as washing of hands. It is universally accepted that while washing hands with water, three basic steps are involved. First is the wetting of both hands, second is the application of soap to both hands, and third, washing the soap away from both hands.

One of the basic problems with the commonly used screw-type faucet is that once the faucet is opened to wet the hands, while the soap is being applied fresh water is continuously flowing down the drain without serving any purpose. As the time taken for applying soap constitutes more than 60% of the time in a normal hand washing cycle it can be easily understood that a large quantity of water is going to waste inadvertently. In addition to this screw-type faucet can continuously waste water if they are left open due to carelessness etc.

Spring-type or water pressure based faucet with automatic closing is now being used in many places to avoid wastage of water as they eliminate the possibility of being left open when not in actual use.

Even though it appears that the spring-type or water pressure based faucet with automatic closing can avoid all wastage of water, a detailed analysis of a hand washing cycle using these faucets will make it clear that the total water actually consumed is more than that of the total water consumed while washing both hands using a screw-type faucet. This is explained below in detail:

Steps involved in washing hands using a spring type or water pressure based faucet with automatic closing and assuming a water flow of 50 ml/second,
    Step-1 press knob and wet one hand 5 sec 250 ml
    Step-2 press knob and wet other hand 5 sec 250 ml
    Step-3 Applying soap to both hands 30 sec NIL,
    Step-4 press knob and wash one hand 20 sec 1000 ml
    Step-5 press knob and wash other hand 20 sec 1000 ml
    Step-6 press knob and wash first hand 5 sec 250 ml
    Total quantity of water consumed=2750 ml It can be easily proved that in the above case apart from consuming more water during an actual washing cycle, as both hands are not free to be rubbed against each other for effective washing of hands, the washing of hands is neither satisfying nor 100% effective in achieving clean hands, which can result in indirect health costs to the user.

Other known faucets as described above are metering type faucets and are based on timing the flow/controlling the flow, which have complex mechanism.

Therefore, there is a need to provide a water-saver faucet that provides means to a user to pre-determine the desired quantity of water for use in controlled and simplified manner.

OBJECTS OF THE INVENTION

The primary object of the present invention is to provide a water-saver faucet to prevent wastage of water by allowing the user to pre-measure and use the desired quantity of water.

An object of the present invention is to provide a water-saver faucet with measured out-flow arrangement.

Another object of the present invention is to provide a water-saver faucet to allow a user to visibly measure as well as continuously see the depletion of water from the measuring vessel for an efficient use of the water.

Another object of the present invention is to provide a water-saver faucet, which works on a simple and direct arrangement involving no complicated mechanisms resulting in very high reliability in use.

Although the present invention has been described with reference to certain embodiments as hereinafter, the invention is not limited to the embodiments. Various other embodiments of the invention will be apparent to a person skilled in the art or follow from routine experimentation.

SUMMARY OF THE INVENTION

This summary is provided to introduce simplified concepts of a water saver faucet which are further described below in the detailed description. This summary is not intended to identify essential features of the claimed subject matter, nor is it intended for use in determining the scope of the claimed subject matter.

The present disclosure relates to a water saver faucet having a faucet body with a spout provided integral of the faucet body and disposed at the bottom half of the faucet body. A knob is attached to a sliding shaft situated at the front end of the faucet body and a water pipeline is attached to other end of the faucet body. An optional check-valve is attached to the faucet body at the end of water pipeline. The sliding shaft is disposed at the centre of the faucet body and it forms the main moving part of said faucet body and carrying on it one or more seal assemblies helping in sealing or releasing the flow of water. A seal assembly is provided within the faucet body. A graduated measuring vessel is attached to the faucet body and it enables the user to directly pre-measure the quantity of water that will flow out of the water saver faucet. An air vent valve is provided on top of the graduated measuring vessel thereby it facilitates the in/out flow of water through the graduated measuring vessel. An adopter which facilitates the assembly of the graduated measuring vessel and the faucet body is provided.

BRIEF DESCRIPTION OF THE DRAWINGS

The novel features of the invention are set forth in the appended claims hereto. The invention itself, however, as well as a preferred mode of use, further objectives, and advantages thereof, will best be understood by reference to the following detailed description of illustrative embodiments when read in conjunction with the accompanying drawings, wherein the same numbers are used throughout the drawings to reference like features, and wherein:

FIG. 2 is a cut section view of the check-valve, showing the internal details.

FIG. 3 is a cut section view of the water-saver faucet of the present invention depicting internal arrangement.

FIG. 4 is a half-sectional view of the chuck-nut, which is mounted on the front end of the check-valve.

FIG. 5 depicts a sealing washer, made of flexible material mounted between the front end of the chuck-nut and the rear end of the housing.

FIG. 6 is a cross-sectional view of transparent measuring vessel used for storing water.

FIG. 7 is a cross sectional view of the adopter.

FIG. 8 is a cross-sectional view of the seal seat.

FIG. 9 depicts the sliding shaft, which forms the main moving part of the faucet.

FIG. 10 is a cross-sectional view of the front housing portion of the faucet.

FIG. 11 is a cross-sectional view of the knob.

FIG. 12 depicts three parts which are the internal parts of the check-valve, the spring retainer cir-clip, the spring and the ball.

FIG. 13 is a cross-sectional view of the outer housing of check-valve.

FIG. 14 depicts chuck-nut and sealing washer.

FIG. 15 is a cross-sectional view of the rear housing portion of water-saver faucet of the present invention.

FIG. 16 is a cross sectional view of retainer spring.

FIG. 17 depicts main seal assembly arrangement of the faucet.

FIG. 18 is a cross-sectional view of completely assembled water-saver faucet of the present invention along with the check valve, water pipe line and the knob in the pressed condition.

FIG. 19 shows the air-vent assembly in disassembled condition showing the various parts.

FIG. 20 shows the top view of the top part of the measuring vessel.

FIG. 21 shows a cross sectional view of an embodiment of the water saver faucet with measured out-flow arrangement.

FIG. 26 shows a cross sectional view of yet another embodiment of water saver faucet with measured out-flow arrangement wherein sealing arrangement is in the form of sliding sealing faces.

FIG. 27 shows front view and top view of a sliding shaft which forms a part of the water saver faucet with measured out-flow arrangement.

FIG. 28 shows a cross sectional view of water saver faucet with measured out-flow arrangement wherein the sliding sealing face allows water flow from water pipeline to measuring vessel and is in sealed condition for exit through the spout.

FIG. 29 shows a cross sectional view of water saver faucet with measured out-flow arrangement wherein the sliding sealing face allows water flow from measuring vessel to the spout and is in sealed condition for entry of water through the water pipeline.

DETAILED DESCRIPTION OF THE INVENTION

Figure 1:
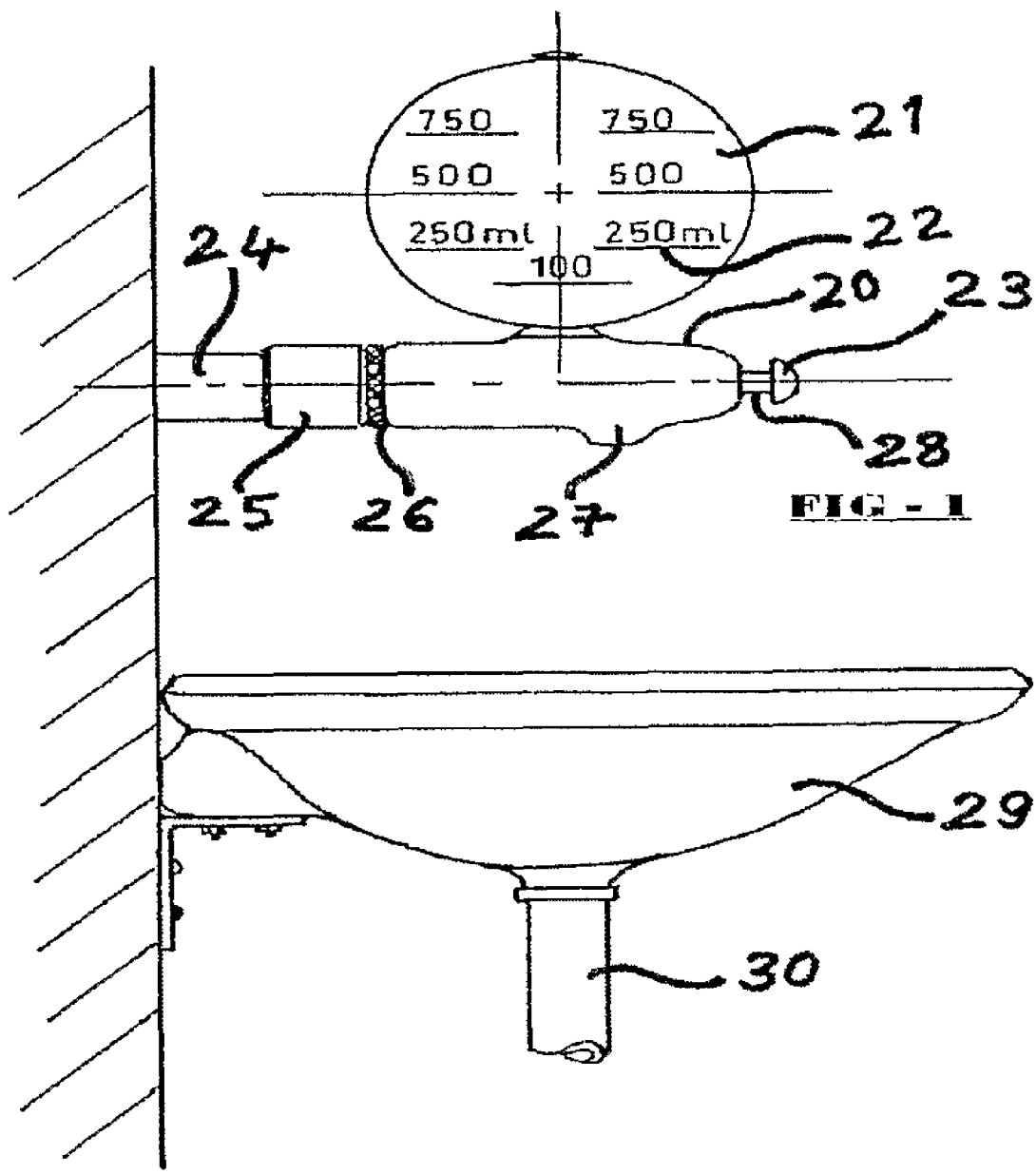
FIG. 1 depicts the outer mounted view of one of the versions of a "Water-saver faucet with measured out-flow arrangement".

The present invention provides a water-saver faucet with measured out-flow arrangement. The embodiments of the present invention are described initially by referring to FIG. 1, which shows the outer mounted view of water-saver faucet with measured out-flow arrangement wherein faucet 20 is connected to a measuring vessel 21 made out of transparent material and forms an integral part of faucet 20. The level indicators 22 are marked on the transparent vessel 21, to provide a level of water stored in it. A knob 23 is connected to the faucet 20, for operating the faucet 20. A water pipe line 24 for supplying the water is disposed to mount the faucet 20. A check-valve 25 is an extended adopter part of the faucet 20. A chuck-nut 26 forming a part of the faucet 20 is arranged to help in proper positioning of the faucet 20. A spout 27 is of the faucet 20 is arranged through which the measured water flows out. A sliding shaft 28 is disposed forming the main moving part of the faucet 20.

Now by referring to FIG. 2 the check valve 25 with an outer housing 36 is provided to house the check valve 25. A retainer in the form a cir-clip 33 is arranged at one end for spring 34. The other end of the spring 34 acts on ball 35, which is in contact with ball seat provided at the front end of the check-valve housing 36 mentioned as above.

Referring to FIG. 3, an air vent valve 31 is provided on top of the measuring vessel 21 on the top portion of the vessel to provide desired air pressure in order to facilitate the flow of the water. A threaded adopter 32 forming an integral part of the faucet 20 is disposed to facilitate the assembly of the measuring vessel to the main body the faucet 20. The main body of the faucet 20 is formed by means of two housing sections 37 and 38. A retainer spring 40 is disposed to retain water seal assembly 41 of the faucet 20. The seal assembly 41 is made of a rigid outer body and a flexible inner core which when in contact with main seal seat 42, under the pressure of spring 40 results in an effective water seal when the faucet 20 is not in operation.

A chuck nut 26 as shown in FIG. 4 is mounted on the front end of the check-valve 25, by means of suitable threads provided on both of them. This chuck-nut 26 is to help in proper positioning of the main body of the faucet 20 with spout 27 facing downwards.

A washer 39 as shown in FIG. 5 made of flexible material is mounted between the front end of the chuck-nut 26, and the rear end of the housing section 37.

The transparent measuring vessel 21 as shown in FIG. 6 is provided with an opening 43 at the bottom of the vessel 21, having preferably a threaded profile hole for mounting the vessel 21.

An adopter 32, with a water passage hole 44 as shown in FIG. 7 is arranged in the opening 43 of the adopter 32 to provide a passage and to permit the flow of water from and into transparent graduated measuring vessel. A projection 45 is disposed on the adopter 32 for mating with the threaded hole 43. A stepped bottom portion 46 of the adopter 32 is used for the adopter to be located and secured on the front housing section 38 as shown in FIG. 3.

The sliding shaft 28 as shown in FIG. 9 forms the main moving part of the faucet 20. Cylindrical projection 48 with a smaller diameter disposed at the rear end of the sliding shaft 28 for releasing the check-valve 25 and to allow water through-flow, whenever the sliding shaft 25 is moved by pressing the knob 23. A threaded portion 49 at the rear end of the sliding shaft 28 is provided to accommodate the main seal assembly 41 as shown in FIG. 3.

Axial grooves 50 provided on the sliding shaft 28 to allow easy water flow when the seal assembly 41 is in open condition. A larger diameter step 51 on the sliding shaft 28 is disposed with its axis eccentric to the sliding shaft axis. The side faces of this step 51 are at an acute angle to the sliding shaft axis. The step 51 locates and slides in the eccentric hole provided in front housing portion of the faucet 20 by preventing the rotary movement of the sliding shaft 28.

The bottom portion of this step 51 closes the water flow to the spout 27, whenever the sliding shaft 28 is operated by pressing knob 23. A small step 52 is disposed at the front end of the sliding shaft 28, to locate and fix the knob 23 on the sliding shaft 28.

Now by referring to FIG. 10 which shows the cross-sectional view of the front housing portion of the faucet 20, wherein a concentric bore 53 provided at the rear end to accommodate the main seal seat 42 as shown in FIG. 8 and to receive the step 66 provided on the rear housing portion 37. A face member 54 is provided in the bore 53 for locating the main seal seat 42. The spout 27 is disposed to allow the passage of water. A long eccentric bore 55 provided in the front housing portion 38 to accommodate the eccentric step 51 on the sliding shaft 28 shown in FIG. 9. A guiding and locating hole 56 for the sliding shaft 28 provided in the front of the housing portion 38. A circular counter bore 57 made on the above said housing 38 to locate the step 46 of the threaded adopter and fix the threaded adopter 32 shown in FIG. 7. An angularly positioned hole 58 is disposed connecting the centre of the counter bore 57 to the long eccentric bore 55.

Now by referring to FIG. 11 the mounting of knob 23 on the sliding shaft 28 by means of a locating and fixing hole 59.

The check-valve as shown in FIG. 12 depicts three parts, which are the internal parts of the check-valve 25 shown in FIG. 2, wherein the spring retainer cir-clip 33, spring 34 and ball 35.

FIG. 13 shows a cross-sectional view of the outer housing 36, of check-valve 25, shown in FIG. 2. It has internal threads 60, at the rear end for connecting the "Water-saver faucet with measured out-flow arrangement" on to the water pipe line 24, shown in FIG. 1. 61 is the circular internal groove provided in the check-valve outer housing 36, to accommodate the spring retainer cir-clip 33 shown in FIG. 12 at the front end of the check-valve housing 36. It has external threads 62, to mate in assembly with the internal threads 64, of the housing portion 37 shown in FIG. 15.

The chuck nut arrangement in two parts is shown in FIG. 14 along with the sealing washer as shown in FIG. 5.

Now by referring to FIG. 15 which is a cross-sectional view of the rear housing portion 37, wherein the internal step 65 provided in the housing 37 to locate and retain the rear end of the main spring 40 shown in FIG. 3. An external step 66 is provided at the front of rear housing portion 37 and this step 66 fits into the bore 53 as shown in FIG. 10.

FIG. 16 shows the main retainer spring 40, wherein 67 is its rear end face and 68 is the front face of the spring 40. On assembly the spring will be in a compressive state.

FIG. 17 shows two parts, together forming the main seal assembly 41, wherein 69 is the rigid housing for the flexible sealing washer 70.

FIG. 18 shows the cross-sectional view of complete assembled water-saver faucet with measured out-flow arrangement of the present invention along with the check valve 25 and water pipe line 24, and the knob 23 in the pressed condition whereby the sliding shaft 28 is in its forward position causing both the main valve and the check valve in open condition and the spout to be in closed condition, allowing the water flow to pass through the check valve and main valve and thereby causing the water to fill up in the measuring vessel 21. The water flow being indicated by the arrow marks.

FIG. 19 shows the air-vent assembly 31, shown in FIG. 18, in disassembled condition showing the various parts of this assembly, wherein a small portion of the measuring vessel 21 is shown in cross section, 71 is the screw to hold the cover 72 and the main part 73 of the air-vent valve 31. 73 is made out of light material and construction to allow it to float in water, so that when the water fills up fully in the measuring vessel 21, part 73 raises and closes the air-vent automatically preventing water leaking out of the air-vent. And when the water drains out, part 73 drops down allowing air to enter the measuring vessel.

FIG. 20 shows the top view wherein a portion of the top part of the measuring vessel 21, with its square hole accommodating the smaller square body portion of part 73, shown in FIG. 19. The clearance provided between the two square sections is for air passage in and out of the measuring vessel. Provision is made in the air-vent assembly to keep it all the time closed, if pressured out-flow of water from the spout is desired. This can be achieved by minor repositioning the assembly of the part 73, such that the projections provided on it will take a location out-side of the depressions 74 provided on the top of the measuring vessel 21.

FIG. 21 shows a cross section view of another embodiment of the "water saver faucet with measured out-flow arrangement" wherein an auxiliary seal 41/1 is provided in the water passage to the spout and the auxiliary seal body 41-1b acts as a guide for the sliding shaft.

Figures 22, 23:
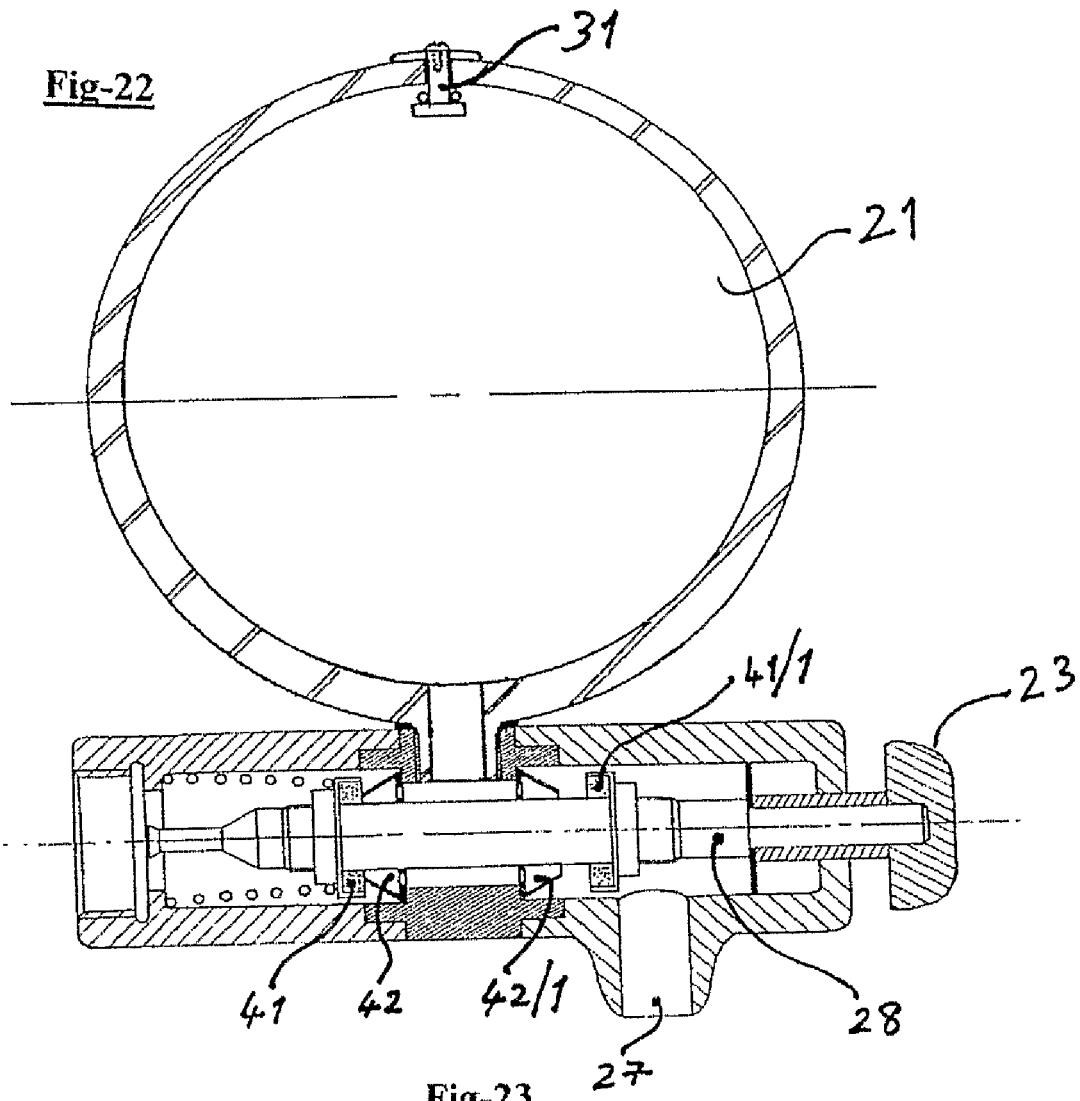
FIG. 22 shows a cross-sectional view of another embodiment of the water saver faucet with measured out-flow arrangement.
FIG. 23 shows front view, back view and side view of conical seal seats of the main seal and the auxiliary seal respectively.

FIG. 22 shows a cross-sectional view of another embodiment of "Water Saver Faucet with Measured Out-Flow Arrangement" wherein a graduated measuring vessel 21' is provided with an air-vent arrangement 31 at its top portion. Sliding shaft 28 is provided with a knob 23 at its extreme end. The sliding shaft 28 is also provided with a main seal 41 that is mounted on one side and an auxiliary seal 41/1 mounted on the opposite side, the main seal 41 and the auxiliary seal 41/1 consists of seal seats, respectively named as main seal seat 42 and auxiliary seal seat 42/1. The main body of faucet is also provided with a spout 27 at its bottom-half. When the knob 23 is in the released condition as shown in this FIG. 22, the main seal (formed by 41 being in contact with 42) is in closed position and the auxiliary seal arrangement is in open position as the seal 41/1 is away from seal seat 42/1.

On pressing the knob 23, the sliding shaft 28 moves, causing the auxiliary seal 41/1 to close and the main seal 41 to open (also causing the opening of the check valve 25 not shown in this figure) thereby allowing the water to flow through and fill up in the graduated measuring vessel 21.

On releasing the knob 23, the sliding shaft 28, slides back to its original position due to spring pressure, causing re-closing of the main seal 41 and reopening of the auxiliary seal 41/1, thereby allowing the pre-measured water collected in the graduated measuring vessel 21 to freely flow out of the spout 27, due to gravity.

FIG. 23 shows the front view, back view and the side view of the conical seal seats 42 and 42/1 of the main seal 41 and the auxiliary seal 41/1 respectively. The mouth of the cone forms the seal seat, at the base of the cone the central circular opening forms the guide for the sliding shaft 28 mentioned in FIG. 22 above. The smaller holes (surrounding the larger central guiding hole) together form the main water passage.

Figure 24:
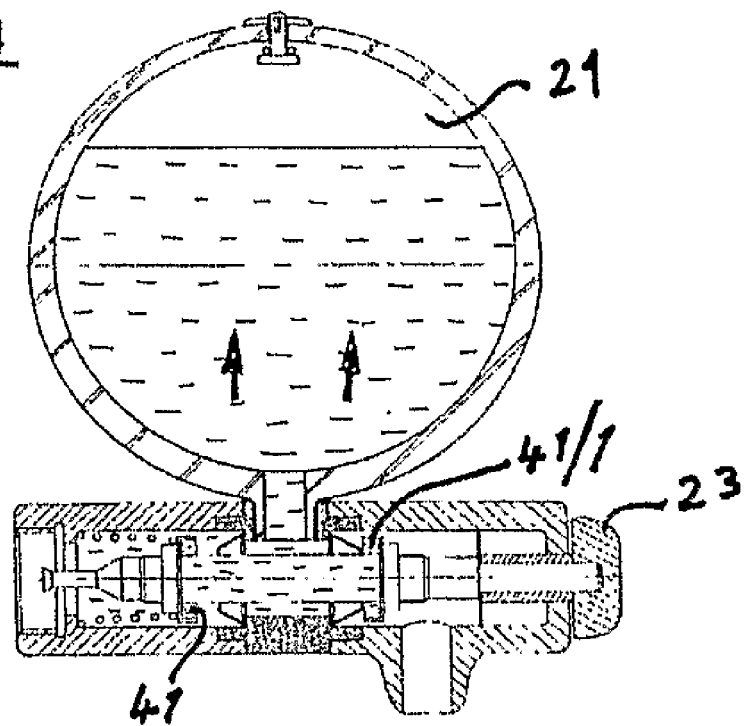
FIG. 24 shows a cross sectional view of water saver faucet with measured out-flow arrangement wherein the knob is in pressed condition.

FIG. 24 shows the cross sectional view of "Water Saver Faucet with Measured Out-Flow Arrangement" wherein the knob 23 is in pressed condition and the figure shows water filling up in the graduated measuring vessel 21.

Figure 25:
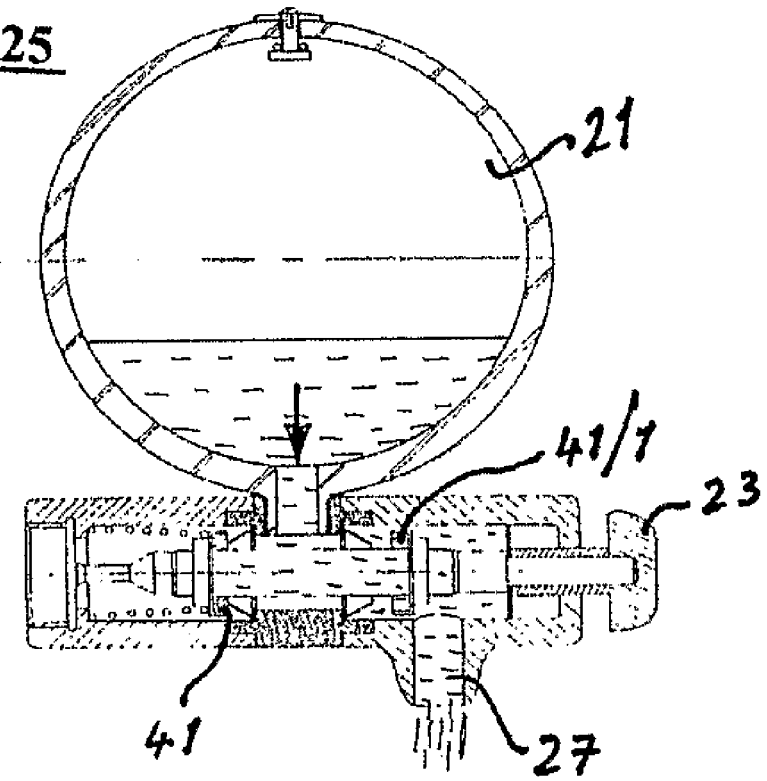
FIG. 25 shows a cross sectional view of water saver faucet with measured outflow arrangement wherein the knob is in released condition.

FIG. 25 shows the cross sectional view of "Water Saver Faucet with Measured Out-Flow Arrangement" wherein the knob 23 is in released condition, and the figure shows pre-measured water collected in the graduated measuring vessel freely flowing out of the spout 27.

FIG. 26 shows a cross-sectional view of another embodiment of "Water Saver Faucet with Measured Out-Flow Arrangement" wherein sealing arrangement is in the form of "sliding sealing faces" on sealing strips of abrasion resisting material such as ceramic. There are 4 such strips provided, 2 of the strips are rigidly fixed on either side of the hollow box like middle portion 28/1 on the sliding shaft 28.

The other 2 strips are located inside the body of the faucet and forms a sliding contact with the earlier mentioned 2 strips fixed on the sliding shaft 28. The main water passage 75 has two water bifurcated water passages, one being the water passage 76 leading to the graduated measuring vessel 21 and the other being the water passage 77 leading to the spout 27. The check-valve 25 is shown in mounted position. It also shows the knob 23 in the released condition; thereby water passage 76 is in union with water passage 77, through the appropriate "ports" provided on the sealing strips and portion 28/1 (mentioned above) on either side. The main water passage 75 is in closed condition.

FIG. 27 shows the top view and front view of the sliding shaft 28 which forms a moving part of the water saver faucet with measured out-flow arrangement, the complete assembly of which is already discussed in FIG. 26, wherein the sliding shaft 28 comprises a hollow box-like middle portion 28/1 on its centre. It has a larger opening portion or larger port 28/3 on its top surface and a smaller opening portion or a smaller port 28/2 at its bottom surface.

FIG. 28 shows cross sectional view of water saver faucet with measured out-flow arrangement wherein the sliding sealing face allows water flow from water pipeline to measuring vessel and is in sealed condition for exit through the spout. When the knob 23 is in the pressed condition, the main water passage 75 and the water passage 76 leading to the graduated measuring vessel are in open condition allowing the water flow from the water pipeline to pass through the water passage 76 to the graduated measuring vessel 21. In this position, the water passage 77 to the spout 27 is in closed condition thereby not allowing any water passage through the spout 27. Enclosure for water passage 77 is formed by a bottom portion in the sliding area 78. Similarly, enclosure for main water passage 75 and water passage 76 are formed by a top portion at the sliding area 79.

FIG. 29 shows a cross sectional view of water saver faucet with measured out-flow arrangement wherein the sliding sealing face allows water flow from measuring vessel to the spout and is in sealed condition for entry of water through the water pipeline. When the knob 23 is in the released condition, the main water passage 75 is in closed condition, while the water passage 76 leading to the graduated measuring vessel 21 and the water passage 77 leading to the spout 27 are in open condition. Enclosure for water passage 77 is formed by a bottom portion in the sliding area 78. Similarly, enclosure for main water passage 75 and water passage 76 are formed by a top portion at the sliding area 79.

Figure 30:
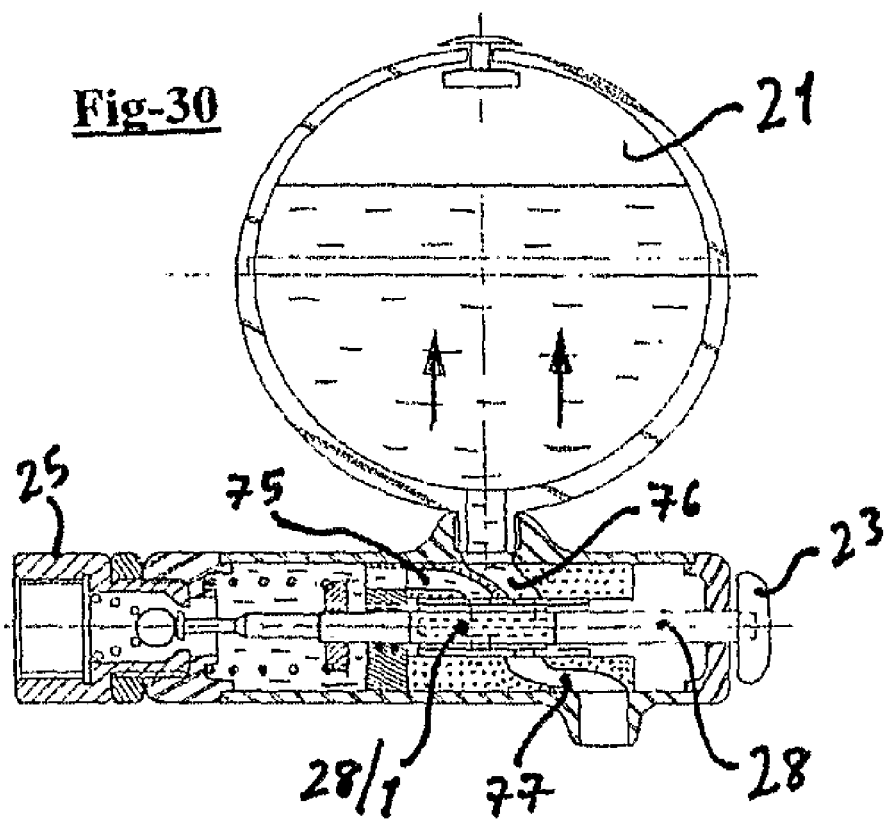
FIG. 30 shows a cross sectional view of water saver faucet with measured out-flow arrangement shown in FIG. 26, wherein the knob is in pressed condition.

FIG. 30 shows a cross-sectional view of water saver faucet with measured out-flow arrangement having the knob 23 in pressed condition thereby the main water passage 75 is in union with water passage 76, through the appropriate "ports" provided on the sealing strips as well as on 28/1, allowing water to flow through and fill up in the graduated measuring vessel 21. water passage 77 leading to the spout 27 will be in closed condition.

Figure 31:
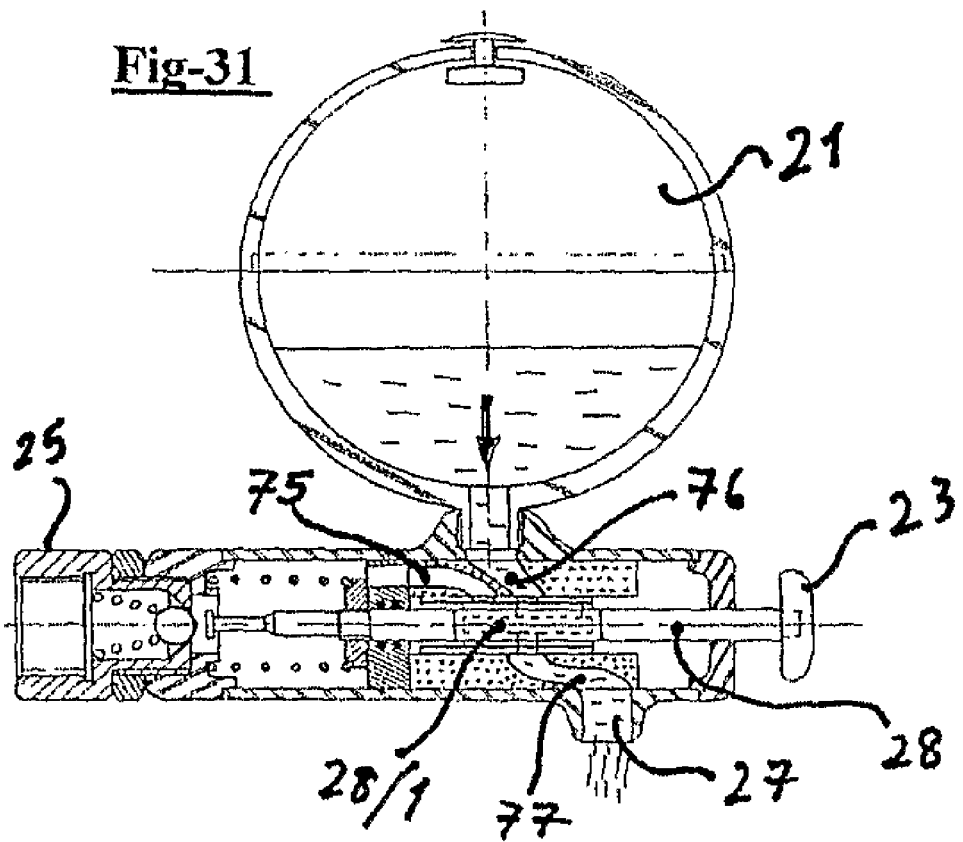
FIG. 31 shows a cross sectional view of water saver faucet with measured out-flow arrangement shown in FIG. 26, wherein the knob is in released condition.

FIG. 31 shows a cross-sectional view of water saver faucet with measured out-flow arrangement having the knob 23 in released condition thereby the main water passage 75 is in closed condition. Water passage 76 is in union with water passage 77, through the appropriate "ports" provided on the sealing strips as well as on 28/1, allowing the pre measured water collected in the graduated measuring vessel 21 to flow freely out of the spout 27.

The figures of various parts and working principle described above demonstrate embodiments within the scope of the present invention. They are given solely for the purpose of illustration and are not to be construed as a limitation of the present invention as many variations thereof are possible without departing from the spirit and scope of the invention.

Advantages of the Present Invention

1. The water-saver faucet with measured out-flow arrangement of the present invention has a major advantage that allows a user to pre-decide the exact quantity of water to be used every time the faucet is operated, as well as he/she is in a position to continuously pre-judge the out-flow, there by allowing the person to make the optimum use of the water. As the person using the faucet gets a clear cut idea of actual quantity of water used, there is every possibility of improvement in the efficiency of usage, thus contributing to optimum use of water for any purpose, contributing to saving of water from unnecessary wastage.
2. The water faucet of the present invention allows the user to pre-measure the water to be used, thus giving the user the direct and measured control on out-flow to make optimum use of the water.
3. The water-waver faucet with measured out-flow Arrangement is cost effective since it works on a simple and direct arrangement involving no complicated mechanism.

I claim:

1. A water saver faucet for hand washing comprising:
   a faucet body, having
   a spout provided integral of said faucet body, said spout is disposed at the bottom half of said faucet body;
   a water pipeline attached to other end of said faucet body;
   a check-valve attached to said faucet body at the end of said water pipeline;
   a sliding shaft that is disposed at the centre of said faucet body, said sliding shaft forming the main moving part of said faucet body and carrying on it one or more seal assemblies helping in sealing or releasing the flow of water; and
   a knob attached to said sliding shaft situated at the front end of said faucet body;
   a graduated measuring vessel attached to the top half of said faucet body, wherein said graduated measuring vessel enables the user to directly pre-measure the quantity of water which will flow out of the water saver faucet every time;
   an air vent valve provided on top of said graduated measuring vessel, thereby facilitate in/out flow of water in said graduated measuring vessel; and
   an adapter which facilitates assembly of said graduated measuring vessel and said faucet body;
   wherein depression of the knob causes water from the water pipeline to flow into said graduated measuring vessel, while releasing of the knob causes closure of a flow passage from said water pipeline to said graduated measuring vessel and simultaneous opening of a flow passage to the spout from the graduated measuring vessel, thereby allowing the pre-measured water in the graduated measuring vessel to freely flow out of said spout.

2. A water saver faucet according to claim 1, wherein said depression of said knob causes water from said water pipeline to flow into said graduated transparent measuring vessel for closing the passage to said spout.

3. A water saver faucet according to claim 1, wherein said faucet body is formed of a front housing portion and a rear housing portion.

4. A water saver faucet according to claim 1, wherein said seal assembly is made of a rigid outer body and a flexible inner core which when in contact with a seal seat under the pressure of a spring, results in effective sealing of water when said water saver faucet is not in operation.

5. A water saver faucet according to claim 1, wherein said check-valve is provided with an outer housing and operation of said check-valve is controlled by a check-valve spring held at one side by a retainer and other side by a ball.

6. A water saver faucet according to claim 1, wherein said graduated measuring vessel is transparent enabling pre-measuring the quantity of water that flows in/out of said graduated measuring vessel.

7. A water saver faucet according to claim 1, wherein said seal assembly comprises a main seal and an auxiliary seal, said main seal is provided with a main seal seat on one side of said sliding shaft while said auxiliary seal is provided with an auxiliary seal seat on other side of said sliding shaft, pressing of said knob causes closure of auxiliary seal thereby allowing water to enter graduated measuring vessel, releasing of said knob causes closure of main seal and simultaneous opening of auxiliary seal thereby allowing water from graduated measuring vessel to flow through said spout.

8. A water saver faucet according to claim 1, wherein said seal assembly comprises a main seal and an auxiliary seal, said main seal is provided with a main seal back plate wherein pressing of knob causes a delayed passage of water to graduated measuring vessel through said main seal back plate till the passage of water to the spout is completely closed.

9. A water saver faucet according to claim 1, wherein said seal assembly comprises of four sealing strips of abrasion resistant material, wherein two of said sealing strips are rigidly fixed on either side of hollow box like middle portion of said sliding shaft and other two sealing strips are attached on the inner side of said faucet body so as to maintain a sliding contact with the sealing strips on the sliding shaft, said depression of said knob causing closure of port to said spout and simultaneous opening of port to said graduated measuring vessel, thereby allowing water from the pipeline to flow into said graduated measuring vessel, while said releasing of said knob causing closure of the port to said graduated measuring vessel and simultaneous opening of port to the spout, for allowing the pre-measured water in the graduated measuring vessel to freely flow out of said spout.

* * * * *